United States Patent [19]
Walker et al.

[11] Patent Number: 6,113,006
[45] Date of Patent: Sep. 5, 2000

[54] SNAP TOGETHER WINDOW WASHER NOZZLE

[75] Inventors: Daniel H. Walker, Sylvan Lake; Lyle D. Tincknell, Oxford; Christopher R. Terry, Leonard; Richard Pender, Oakland, all of Mich.

[73] Assignee: ITT Manufacturing Enterprises, Inc., Wilmington, Del.

[21] Appl. No.: 09/177,157

[22] Filed: Oct. 22, 1998

[51] Int. Cl.[7] ................................................ B05B 1/10
[52] U.S. Cl. ................................. 239/284.1; 239/284.2
[58] Field of Search ........................... 239/284.1, 284.2, 239/589, 600; 15/250.01

[56] References Cited

U.S. PATENT DOCUMENTS

| | | | |
|---|---|---|---|
| 2,793,912 | 5/1957 | Krohm | 239/284.1 X |
| 3,008,649 | 11/1961 | Bock et al. | 239/284.1 |
| 3,192,090 | 6/1965 | Sarafinas et al. | 239/284.1 X |
| 3,286,931 | 11/1966 | Webb | 239/284.1 |
| 3,433,416 | 3/1969 | Bauer et al. | 239/284.1 |
| 5,163,619 | 11/1992 | Wada | 239/284.1 |
| 5,173,986 | 12/1992 | Bohmer et al. | 15/250.01 |
| 5,239,726 | 8/1993 | Bianco | 15/250.04 |
| 5,349,717 | 9/1994 | Patterson | 15/250.04 |
| 5,433,382 | 7/1995 | Baumgarten | 239/284.1 |

FOREIGN PATENT DOCUMENTS

| | | |
|---|---|---|
| 63372 | 9/1955 | France . |
| 2931893 | 4/1981 | Germany . |

*Primary Examiner*—Andres Kashnikow
*Assistant Examiner*—Robin O. Evans
*Attorney, Agent, or Firm*—Peter H. Van Winkle

[57] ABSTRACT

A nozzle for a vehicle window washing system includes a stem releasibly attachable through an aperture in a vehicle panel. A through bore extends through the stem and receives a spring biased check ball. Ribs project inward into the bore for supporting the spring and for forming fluid flow paths exteriorly of the spring through the stem. A head having a fluid discharge bore is snap connected to the stem via a mating projection and recess. A flange projects intermediately between the ends of the stem and seats on a vehicle panel to isolate the snap connection between the head and the stem from the mounting connection between the stem and the vehicle panel. A secondary connection is provided by a plurality of projections extending outward from the flange into recesses in a peripheral side wall of the head. A seal is mounted between the stem and the head.

26 Claims, 6 Drawing Sheets

SNAP TOGETHER WINDOW WASHER NOZZLE

BACKGROUND OF THE INVENTION

1. Field of the Invention

The present invention relates, in general to vehicle window wiper systems, and more specifically, to nozzles for spraying washer fluid onto vehicle windows.

2. Description of the Art

In motor vehicles, the window wipers are typically combined with a window washer system for cleaning the vehicle windshield and/or the vehicle backlight. The washer system typically includes a fluid reservoir mounted in the vehicle from which washer fluid is pumped through a fluid conduit to a nozzle which may be mounted on the vehicle cowl disposed between the vehicle hood and the windshield or on the vehicle hood. In the case of a rear backlight, the nozzle is typically mounted below the rear backlight on the rear door panel or on the rear edge of the roof structure above the rear backlight.

In the case of a cowl mounted nozzle, a stem with a through bore has a pair of resilient latch arms which engage the cowl to mount the stem through an aperture in the cowl. One end of the stem is provided with a barb for attachment to the fluid conduit extending from the washer fluid reservoir in the vehicle.

In a typical configuration, the other end of the stem is mountable in a recess in a detachable nozzle head containing a pair of discharge outlets for discharging washer fluid from the nozzle onto the adjacent vehicle window. The second end of the stem is sealingly attached to the head by sonic welding, spin welding or solvent bonding.

However, the sonic or spin welded bonds do not always prove reliable over long term use thereby resulting in a leak forming in the washer fluid delivery system. In addition, the engagement of the latch arms on the stem with the vehicle cowl places all of the mounting strain on the sonic or spin welded joint between the stem and the head. This strain frequently breaksdown during long term use which adversely effects the reliability of the washer nozzle.

It is also known in washer nozzles to provide a spring biased check valve or ball in an interior bore within the nozzle stem. In one construction, a tapered spring provides the biasing force for the ball, with pressurized washer fluid from the reservoir being sufficient to move the ball away from a ball seat within the stem to allow washer fluid to flow around the ball and through the coils of the spring to the discharge outlet(s)in the nozzle head. This has the potential disadvantage that, under high pressure, the spring could be totally compressed thereby blocking fluid flow to the nozzle head.

Thus, it would be desirable to provide a window washer fluid nozzle which overcomes the problems associated with previous washer fluid nozzle designs. It would also be desirable to provide a washer fluid nozzle which has increased, long term reliable use by use of a unique sealed connection between the stem and head of the nozzle which minimizes the occurrence of leaks between the stem and head of the nozzle.

SUMMARY OF THE INVENTION

The present invention is a nozzle for dispensing washer fluid onto a vehicle window.

The nozzle of the present invention includes a stem having opposed first and second ends. Means are carried on the stem for mounting the stem through an aperture in a vehicle panel. A head has a fluid discharge bore extending therethrough. Mating means are provided on the head and the stem for snap connecting the head to the stem. Seal means is engageable between the stem and the head for sealing the stem to the head.

The head preferably includes a body having a top portion and a depending peripheral side wall. A receiver depends from the top portion. In one embodiment, the receiver is formed as a tubular core spaced from the interior surface of the side wall of the head. The second end of the stem is insertable into the receiver.

The snap connecting means includes a mating projection and a recess formed on the head and the stem. The projection is preferably formed on the stem and the recess is formed on the head.

A shoulder is formed adjacent the second end of the stem for receiving the seal means.

The mounting means further includes a flange projecting from the stem between the first and second ends of the stem, the flange is engagable with a vehicle surface. Means are provided for engaging an outer portion of the flange with the side wall of the head. The engaging means preferably includes at least one recess formed in the head. More preferably, a plurality of recesses are circumferentially spaced about the head. A lip extends outward from the flange and is engageable in each recess.

Heat meltable stakes optionally project from the side wall of the head. Recesses formed in the flange receive the stakes to form a heat joinable joint.

At least one rib extends from a top portion of the head into engagement with the flange for stabilizing the head relative to the stem.

A bore extends through the first and second ends of the stem. A spring is mounted in the bore. A seat is formed in the bore. A check ball is biased by the spring into engagement with the seat.

Ribs project radially inward into the bore for supporting the spring. Bore portions are formed between the ribs for fluid flow exteriorly of the spring through the bore portions.

The present nozzle uniquely provides a snap connection between the head and the stem which eliminates the use of sonic or spin welding which has lead to leaks between the head and the stem during long term use of the nozzle. The snap connection is simply constructed and enables the head to be quickly and easily mounted on the stem. The head and the stem are further provided with a seal means for extending the long term, leak free use of the nozzle. Further, the provision of a mounting flange on the stem which seats against a vehicle panel, such as a vehicle cowl, isolates the latching or mounting force provided between the latch arms on the stem and the vehicle from the snap connection between the head and the stem. This minimizes the long term force applied to snap connection of the head and the stem which minimizes any potential breakdown in the snap connection which could result in fluid leaks.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENTS

Figure 7:
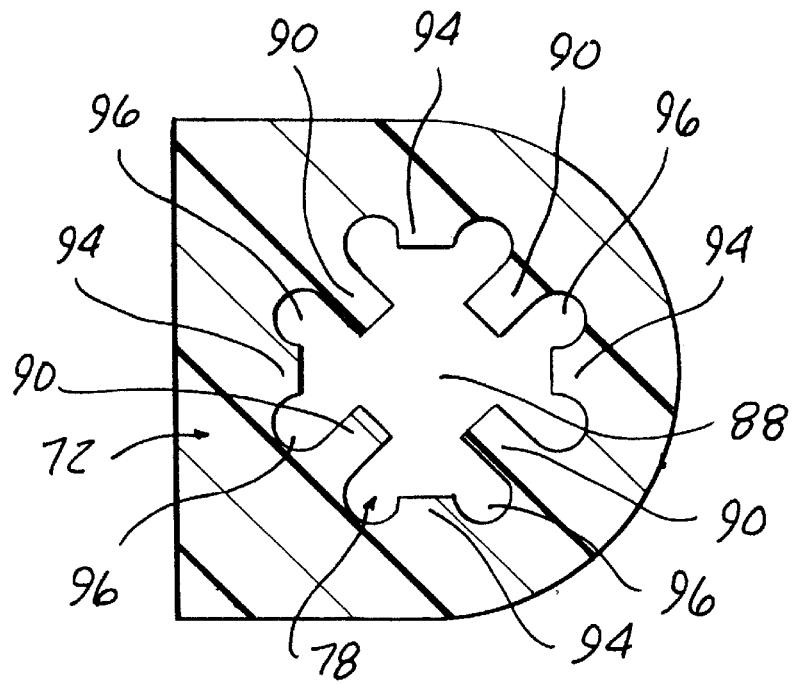
FIG. 7 is a cross-sectional view generally taken along line 7—7 in FIG. 5.
Figure 8:
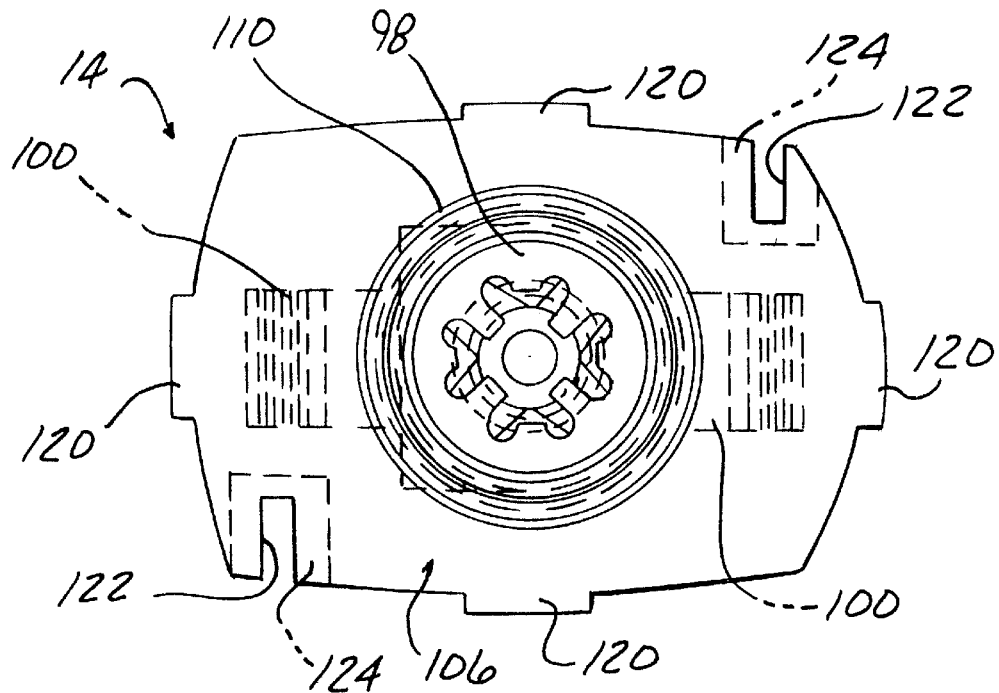
FIG. 8 is a top plan view of the stem shown in FIG. 5.
Figure 9:
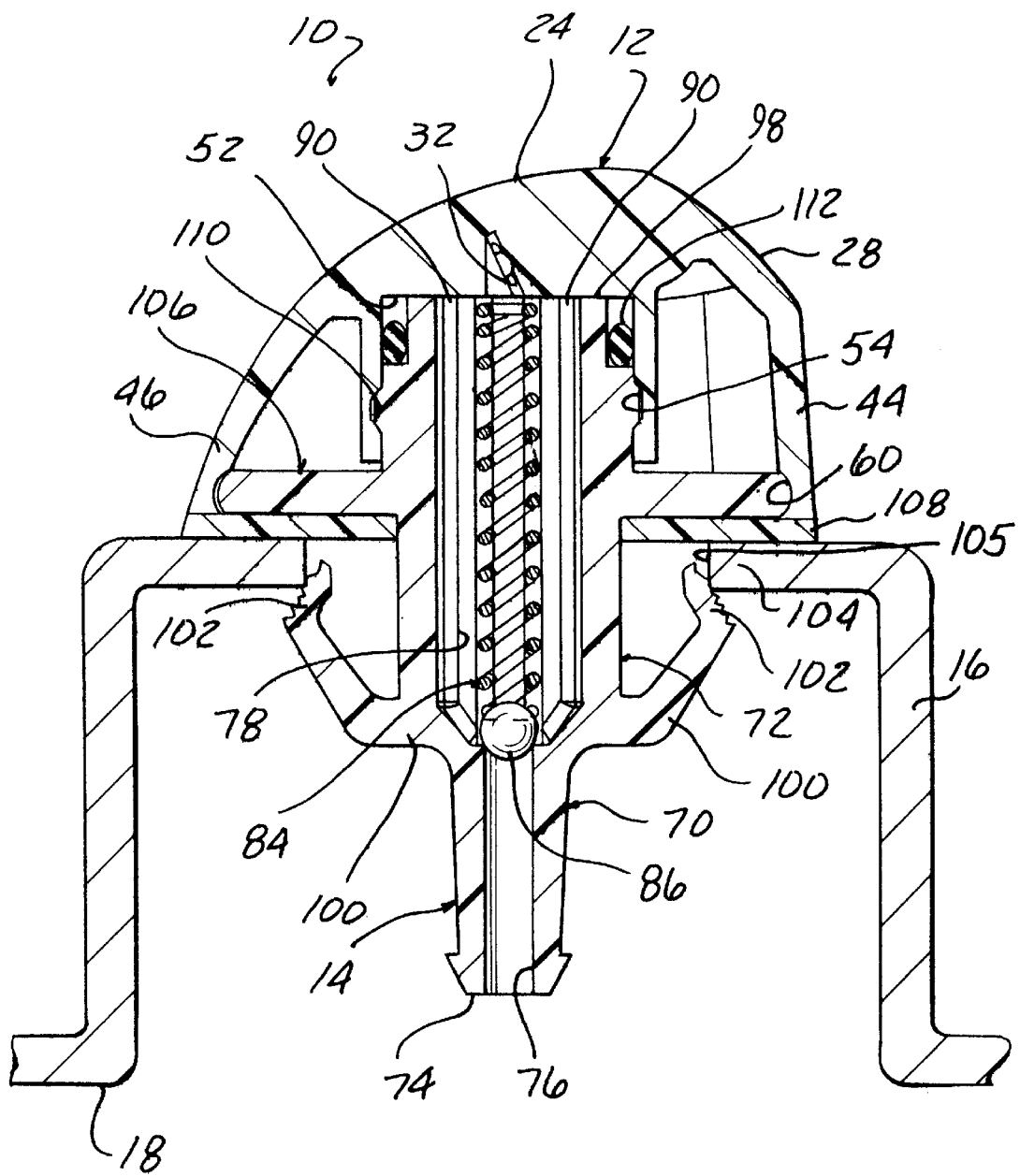
FIG. 9 is a cross-sectional view of the assembled nozzle shown mounted on a vehicle cowl.

Referring now to the drawing, and to FIGS. 1–10 in particular, there is depicted a vehicle window washer nozzle 10. As shown in FIG. 9, the nozzle 10 is mountable on a raised projection 16 on a vehicle cowl 18 which is mounted between a vehicle hood and a vehicle windshield. It will be understood that the nozzle 10, although described hereafter as discharging or spraying washer fluid onto a vehicle windshield, is also adaptable for spraying washer fluid onto a vehicle backlight or any other surface to be cleaned.

As shown in detail in FIGS. 1–4, the head 12 of the nozzle 10 is a one piece molded plastic body formed of a suitable plastic, such as Nylon 6. It will be understood that the exterior shape of the nozzle 10 is by example only as other shapes or configurations are also possible within the scope of the present invention.

Figure 1:
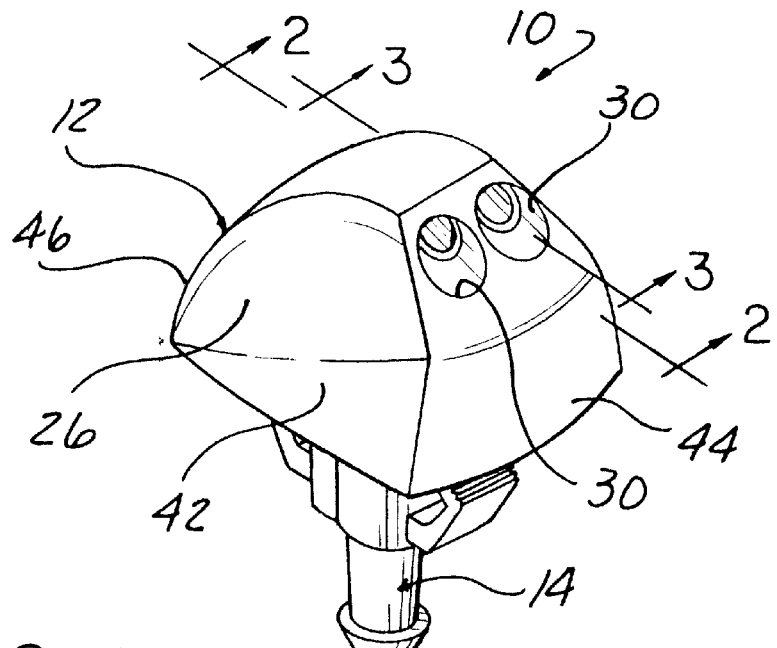
FIG. 1 is a perspective view of a washer nozzle according to the present invention.
Figure 2:
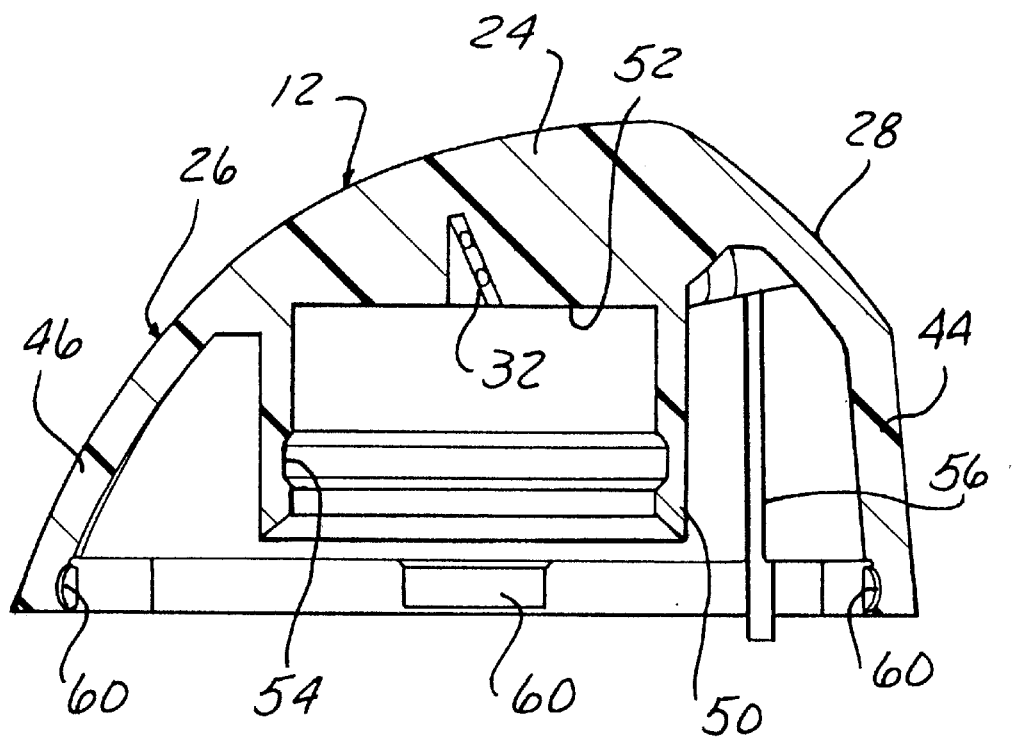
FIG. 2 is an enlarged, cross-sectional view of the head of the nozzle generally taken along line 2—2 in FIG. 1.
Figure 3:
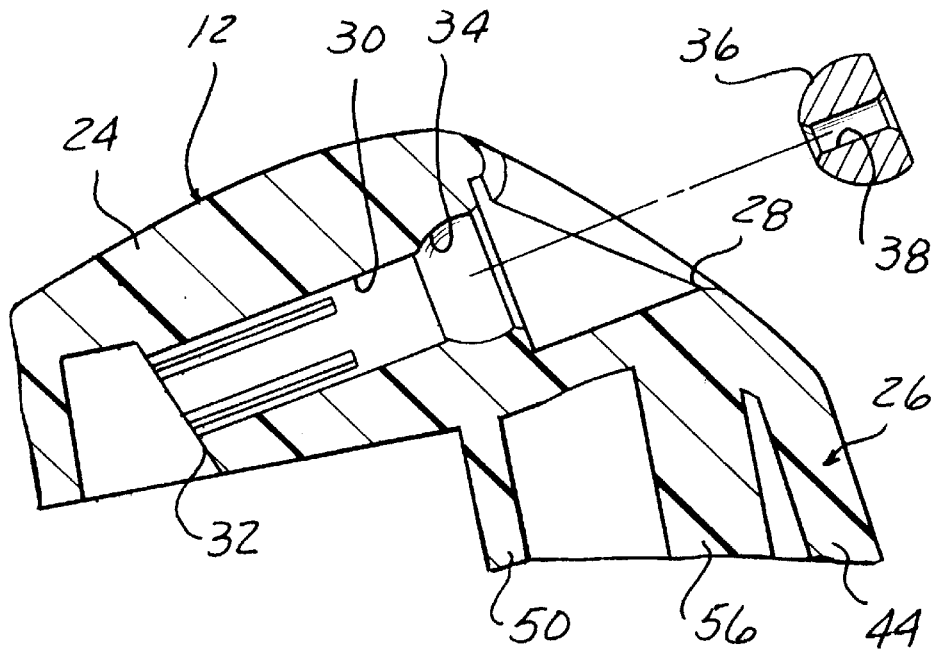
FIG. 3 is an exploded, enlarged, cross-sectional view of the head generally taken along line 3—3 in FIG. 1.

The head 12 has a substantially solid top portion 24 from which a peripheral flange 26 depends as shown in FIGS. 1–3. The exterior surface of the top portion 24 curves smoothly into the peripheral flange 26 along one side of the head 12. An angled surface 28 is formed along one side of the top portion 24. A pair of fluid discharge bores 30 extend through the top portion 24 from the angled surface 28 to a recess 32 formed substantially centrally within the top portion 24. A seat 34 is formed at the end of each discharge bore 30 for receiving a conventional eyeball 36 having a through bore 38 extending therethrough. The eyeball 36 is frictionally held in the seat 34 and may be adjusted to any position so as to discharge or spray fluid onto a specific portion and/or in a specific pattern onto the adjacent vehicle window.

Figure 4:
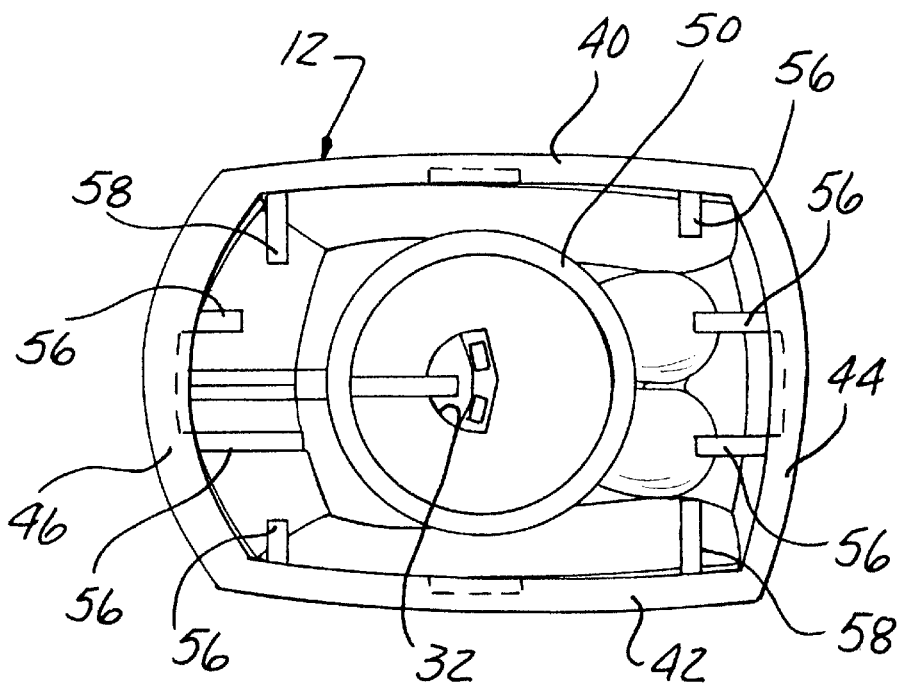
FIG. 4 is a bottom elevational view of the nozzle head shown in FIGS. 1–3.

As shown in FIGS. 1 and 4, and by way of example only, the head 12 has a generally rectangular configuration in which the peripheral flange 26 is formed with a pair of generally planar opposed side walls 40 and 42 and another pair of opposed, generally arcuate side walls 44 and 46.

A stem receiver, such as a central core or sleeve 50, FIGS. 2 and 9, projects downwardly from a bottom surface 52 of the top portion 24 of the head 12. The interior of the head 12 below the bottom surface 52 is cored out or devoid of material between the central core 50 and the side walls 40, 42, 44 and 46 of the peripheral flange 26.

An annular groove or recess 54 is formed in the central core 50 generally intermediate the opposed ends of the central core 50. The purpose of the groove 54 will be described in greater detail hereafter.

In addition, a plurality of ribs, all denoted by reference number 56, are formed in the head 12 and depend from the side walls 40, 42, 44 and 46 of the peripheral flange 26 and/or from the top portion 24. The ribs 56 have a length so as to seat upon a flange on the stem 14, as described hereafter, to support the head 12 on the stem 14. A pair of optional heat meltable stakes 58 also extend from the interior of the peripheral flange 26 of the head 12. The function of the heat meltable stakes 58 will also be described in detail hereafter.

At least one and preferably a plurality of recesses 60 are formed at the bottom edges of the side walls 40, 42, 44 and 46. The recesses 60 are generally spaced 90° apart and arranged in two opposed pairs about the lower edge of the side walls 40, 42, 44, and 46.

As shown in FIG. 1, and in greater detail in FIGS. 5–9, the stem 14 is formed as an elongated tubular body having a first tubular end portion 70 and a contiguous, unitary, second tubular portion 72. Preferably, the stem 14 is formed as a unitary, one piece, molded body of a suitable plastic, such as Nylon 6.

The first tubular portion 70 of the stem 14 terminates in a first end 74. A first bore 76 extends from the first end 74 in the first tubular portion 70 to a second bore 78 in the second tubular portion 72. The second bore 78 is larger in diameter than the first bore 76 such that a seat 80 is formed at the juncture of the first and second bores 76 and 78 within the second tubular portion 72 as shown in FIG. 6.

A raised, angled, exterior barb 82 is formed adjacent the first end 74 of the first tubular portion 70 to securely retain a flexible hose or conduit on the first tubular portion 70. As is conventional, the fluid conduit or hose extends from the stem 14 to the washer fluid reservoir, not shown, in a vehicle.

Figure 6:
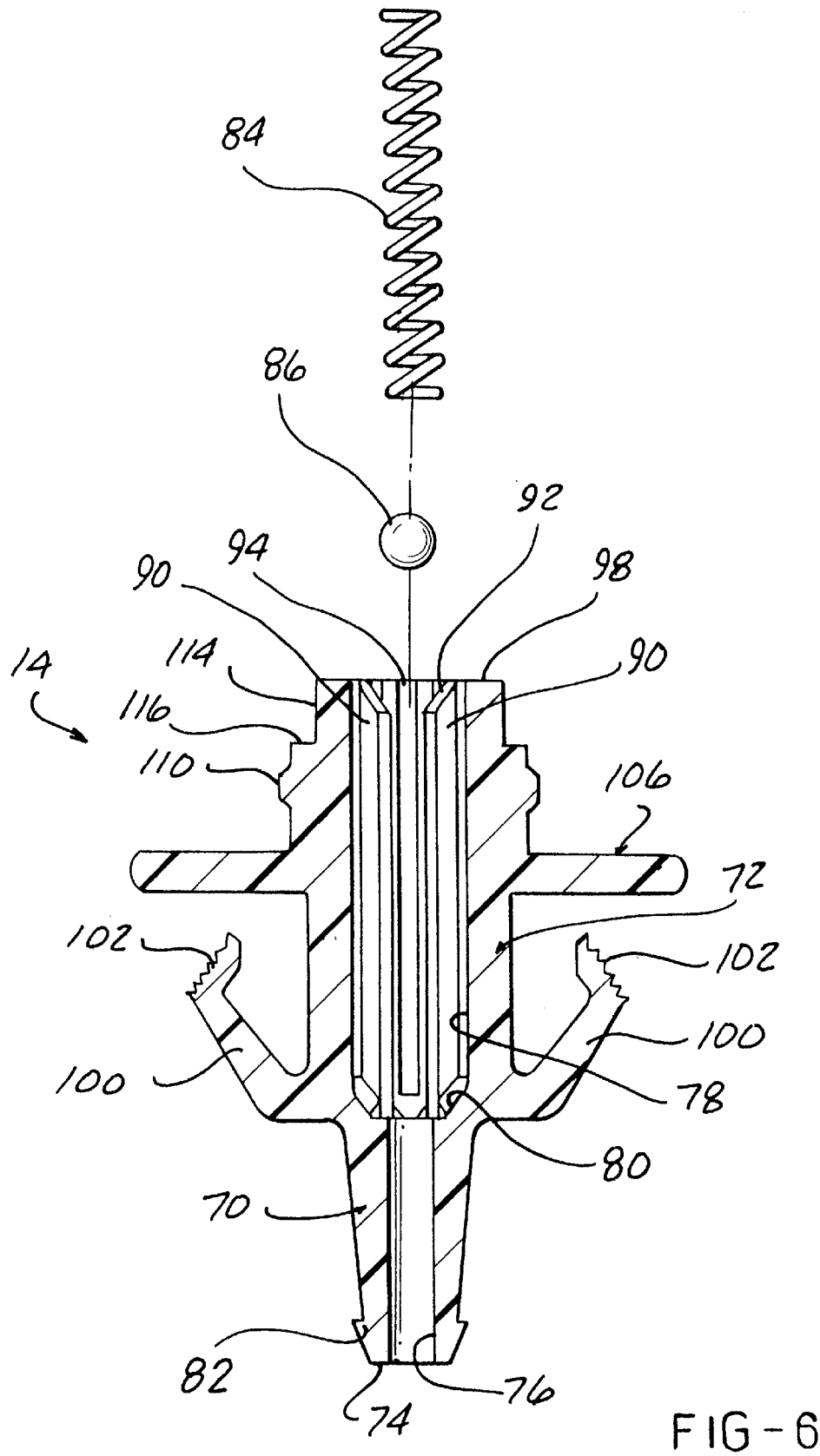
FIG. 6 is an exploded, cross-sectional view generally taken along line 6—6 in FIG. 5.

As shown in FIGS. 6–8, the second bore 78 has a unique configuration which serves the dual function of centering and supporting a biasing coil spring 84 in secure engagement with a check ball 86 as well as providing exterior fluid flow paths around the outside of the coil spring 84 through the second tubular portion 72.

As shown in detail in FIG. 7, the second bore 78 is formed with an enlarged cross section, central bore portion 88 which is sized to receive the coil spring 84. A plurality of ribs, all denoted by reference number 90, defines the diameter of the central bore portion 88 and which project radially inward from the surrounding portions of the second tubular portion 72 to a radially inner edge which centers the spring 84 within the bore 88. The ribs 90 are circumferentially spaced about the central bore portion 88, with four, 90° spaced ribs 90 being depicted by way of example only.

The upper ends 92 of each rib 90 are chamfered or angled as shown in FIG. 6 to guide the insertion of the check ball 86 into the second bore 78.

The circumferential spaces between adjacent ribs 90 are each divided by an intermediate rib 94. The inner edges of the intermediate ribs 94 extend radially less inward toward the central bore portion 88. The intermediate ribs 94 prevent the check ball 86 from lodging in fluid flow bores 96 formed between the ribs 90 and intermediate ribs 94. The fluid flow bores 96 are positioned radially outward from the exterior of the coil spring 84 and communicate at a lower end with the first bore 76 in the first tubular 70 of the stem 14 to form a washer fluid flow path through the stem 14 from the first end 74 to a second end 98 of the second tubular portion 72. Since the second end 98 seats against the bottom surface 52 of the top portion 24 of the head 12, as shown in FIG. 9, washer fluid pumped through the first and second bores 76 and 78 in the stem 14 will pass through the recess 32 in the top portion 24 of the head 12 and be discharged outward through the discharge bores 30 and the eyeballs 32 onto an adjacent vehicle window.

Means are provided on the stem 14 for latchingly mounting the stem 14 to the raised projection 16 on a vehicle cowl 18. The mounting means preferably comprises a pair of diametrically opposed arms 100 which are unitarily molded as part of the stem 14 and project diametrically and radially outward from a lower end of the second tubular portion 72 of the stem 14. Each latch arm 100 terminates in an angled end 102 having a suitable gripping surface, such as a serrated surface, formed thereon. The gripping surface on the angled ends 102 of the arms 100 latchingly engages the inner edges 104 of a keyhole shaped aperture 105 in the projection 16 on the cowl 18 to securely mount the stem 14 and the attached head 12 of the nozzle 10 on the projection 16.

The mounting means of the present nozzle 10 also includes a generally planar flange 106 which is formed intermediately between the first and second ends 74 and 98 of the stem 14 and generally intermediate on the second tubular portion 72. The flange 106 is spaced from the outer ends 102 of the arms 100 so as to be able seat firmly on the upper surface of the inner edges 104 of the projection 16 on the cowl 18. A suitable rubber seal or gasket 108 is interposed between the flange 106 and the upper surface of the projection 16.

It will be understood that the use of the arms 100 to engage the inner edges 104 of the aperture 105 in the projection 16 on the cowl 18 and the flange 106 on the stem 14 isolates the connection between the stem 14 and the head 12 from the mounting forces exerted by the arms 100 thereby preventing any stress from being applied to the head 12 and to stem 14 connection which could cause deterioration of the connection over time and lead to leaks.

Means are also provided for connecting or mounting the head 12 on the stem 14 in a snap-in connection. The snap-in connection is attained by means of an annular projection 110 or the second tubular portion 72 of the stem 14 which seats within the annular recess 54 in the central core 50 of the head 12 to mount the head 12. It will be understood that a reverse arrangement wherein the projection 110 is formed interiorly within the central core 50 on the head 12 and the recess 54 is formed in the second tubular portion 72 of the stem 14 is also possible according to the present invention.

Seal means 112 are provided between the stem 14 and the head 12. Preferably, the seal means 112 is formed of an O-ring which is mounted in a recess 114 extending from the second end 98 of the stem 14. Preferably, the O-ring 112 seats on a shoulder 116 formed at one end of the reduced diameter recess 114 on the second tubular portion 72 of the stem 14.

Figure 5:
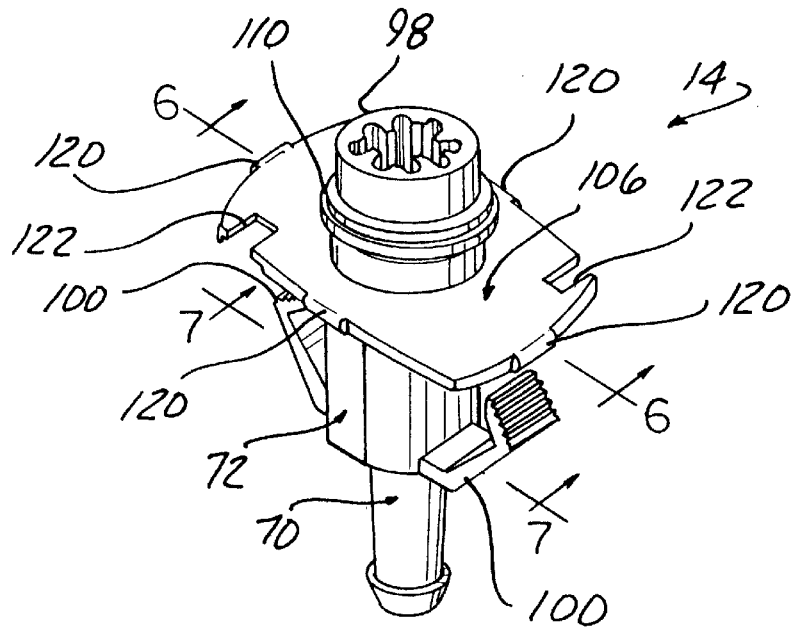
FIG. 5 is a perspective view of the stem of the washer nozzle shown in FIG. 1.
Figure 10:
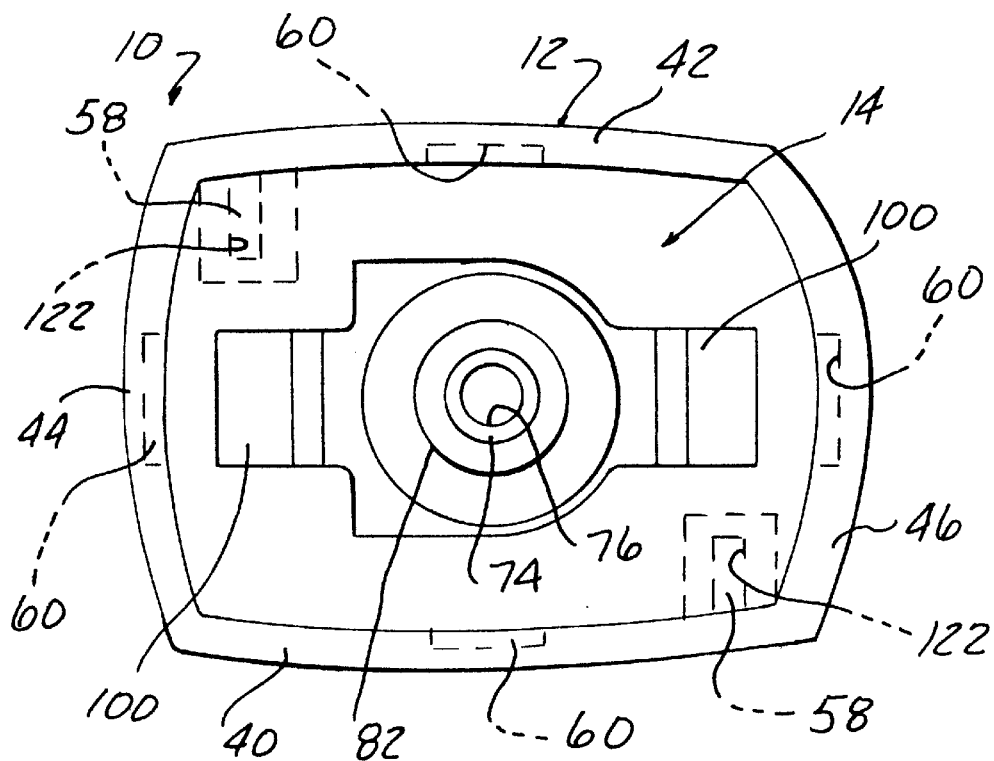
FIG. 10 is a bottom elevational view of the assembled nozzle shown in FIG. 1.

An optional, but preferable secondary connection means is also provided between the stem 14 and the head 12. The secondary connection means is shown in FIGS. 5, 8 and 10, and includes at least one and preferably a plurality of projections or flanges 120 which are unitarily formed with the flange 106 and extend co-planarly outward from outer edges of the flange 106. In an exemplary embodiment shown in FIG. 5, two pairs of diametrically opposed projections 120 are formed on the flange 106. Each of the projections 120 is positioned and sized for releasible, snap-in engagement with one of the recesses 60 formed along the lower edge of the inner surface of the sidewalls 40, 42, 44 and 46 of the peripheral flange 26 of the head 12 as shown in FIG. 10. The secondary connection formed by the projections 120 and the recesses 60 provides additional retention force in combination with the projection 110 and the recess 54 in the head 12 to securely retain the head 12 on the stem 14.

A third and further optional connection means utilizes heat staking of portions of the head 12 to the stem 14. The third connection means preferably includes the pair of heat stakes 58 depending from the peripheral flange 26 on the head 12, as shown in FIG. 4, which are engageable in slots 122 formed on diagonally opposed corners of the flange 106 of the stem 14 as shown in FIGS. 5, 8 and 10. The slots 122 are formed in a shallow recess 124 in the flange 106. During sonic welding, the stakes 58 and the portion of the recess 124 melt and solidly join together to fixedly attach the head 12 to the stem 14. However, it will be understood that the provision of the heat stakes 58 is only an optional connection means in the present nozzle 10.

In order to install the nozzle 10 on the projection 16 of the cowl 18 of a vehicle, the head 12 may be premounted on the stem 14 by the snap-in connections provided through the projection 110 and groove 54 and the secondary connection means formed by the recesses 60 and the lips 120. The optional heat stakes 58 may also be employed for a non-removable attachment of the head 12 to the stem 14. The packing or gasket 108 is mounted about the bottom surface of the flange 106.

Next, the stem 14 is inserted through the aperture 105 in the projection 16 on the cowl 18. During such insertion, the arms 110 bend radially inward to clear the edges 104 of the aperture 105 in the projection 16 until the outer ends 102 of the arms 100 clear the surrounding edges 104 of the aperture 105 at which time the arms 100 snap radially outward bringing the end surfaces 102 into secure engagement with the inner edges 104 of the aperture 105 in the projection 16. This securely mounts the nozzle 10 on the projection 16 of the cowl 18.

In summary, there has been disclosed a unique window washer nozzle having a snap together connection between the head and stem to provide easy assembly while providing the required long term, sealed, leak free construction.

What is claimed is:

1. A nozzle mountable on a vehicle for dispensing window washer fluid onto a vehicle window, the nozzle comprising:
    a stem having opposed first and second ends;
    means, carried on the stem, for mounting the stem to a vehicle, the mounting means including a flange projecting from the stem between the first and second ends of the stem, the flange engagable with a vehicle surface;
    a head having a fluid discharge bore extending therethrough;
    mating means, carried on the head and the stem, for snap connecting the head and the stem together; and
    separate seal means, sealingly engagable between the stem and the head, for sealing the stem to the head.

2. The nozzle of claim 1 wherein the snap connecting means comprises:
    a mating projection and recess formed on the head and the stem.

3. The nozzle of claim 1 wherein the head comprises:
    a body having a top portion and a depending peripheral side wall;
    a receiver formed in the body;
    the second end of the stem insertable into the receiver; and
    the snap connecting means carried on the receiver and the stem.

4. The nozzle of claim 3 wherein the snap connecting means comprises:

a mating projection and recess formed on the head and the stem.

5. The nozzle of claim 4 wherein:

the projection is formed on the stem and the recess is formed on the receiver.

6. The nozzle of claim 5 further comprising:

a shoulder formed adjacent the second end of the stem, the seal means mounted on the shoulder.

7. The nozzle of claim 3 wherein the receiver comprises:

a tubular core depending from the top portion of the body, the tubular core spaced from an interior surface of the sidewall of the body.

8. The nozzle of claim 4 further comprising:

a flange projecting from the stem between the first and second ends of the stem, the flange mountable with a vehicle surface.

9. A nozzle mountable on a vehicle for dispensing window washer fluid onto a vehicle window, the nozzle comprising:

a stem having opposed first and second ends;

a flange projecting from the stem between the first and second ends of the stem, the flange mountable with a vehicle surface;

a head having a fluid discharge bore extending therethrough;

mating means, carried on the head and the stem, for snap connecting the head and the stem together;

the head including:
a body having a top portion and a depending peripheral side wall;
a receiver formed in the body;
the second end of the stem insertable into the receiver; and
the snap connecting means carried on the receiver and the stem and formed of a mating projection and a recess;

seal means engageable between the stem and the head for sealing the stem to the head; and means for connecting the flange to the head.

10. The nozzle of claim 9 further comprising:

at least one recess formed in the head.

11. The nozzle of claim 10 wherein:

the at least one recess comprises a plurality of recesses; and further comprising:
a plurality of lips extending outward from the flange, each lip engagable in one of the plurality of recesses.

12. The nozzle of claim 9 further comprising:

a plurality of recesses circumferentially spaced about of the head.

13. The nozzle of claim 10 further comprising:

heat meltable stakes projecting from the head; and
recesses formed in the flange for receiving the stakes.

14. A nozzle mountable on a vehicle for dispensing window washer fluid onto a vehicle window, the nozzle comprising:

a stem having opposed first and second ends;
a bore extending through the first and second ends of the stem;
a spring mounted in the bore;
a seat formed in the bore;
a check ball by the spring into engagement with the seat;
ribs projecting radially inward into the bore for supporting the spring;
means, carried on the stem, for mounting the stem to a vehicle;

a head having a fluid discharge bore extending therethrough;

mating means, including a mating projection and recess formed on the head and the stem, for snap connecting the head and the stem together;

the head including:
a body having a top portion and a depending peripheral side wall;
a receiver formed in the body;
the second end of the stem insertable into the receiver; and
the snap connecting means carried on the receiver and the stem; and seal means engagable between the stem and the head for sealing the stem to the head.

15. The nozzle of claim 14 further comprising:

bores formed between the ribs for fluid flow exteriorly of the spring through the stem.

16. The nozzle of claim 14 further comprising:

a recess forme d in the head in fluid flow communication with the fluid discharge bore in the head, the recess disposed in fluid flow communication with the bore in the stem when the head is connected onto the stem.

17. A nozzle mountable on a vehicle for dispensing window washer fluid onto a vehicle window, the nozzle comprising:

a stem having opposed first and second ends;
a bore extending through the first and second ends of the stem;
a spring mounted in the bore;
a seat formed in the bore,
a check ball biased by the spring into engagement with the seat;
ribs projecting radially inward into the bore for supporting the spring;
means, carried on the stem, for mounting the stem to a vehicle;

a head having a fluid discharge bore extending therethrough;

mating means, carried on the head and the stem, for snap connecting the head and the stem together; and seal means engagable between the stem and the head, for sealing the stem to the head.

18. The nozzle of claim 17 further comprising:

bores formed between the ribs for fluid flow exteriorly of the spring through the stem.

19. The nozzle of claim 17 further comprising:

at least one rib extending from the head into engagement with the flange.

20. The nozzle of claim 17 further comprising:

a recess formed in the head in fluid flow communication with the fluid discharge bore in the head, the recess disposed in fluid flow communication with the bore in the stem when the head is connected to the stem.

21. A nozzle mountable on a vehicle for dispensing window washer fluid onto a vehicle window, the nozzle comprising:

a stem having opposed first and second ends;
a flange projecting from the stem between the first and second ends of the stem, the flange engagable with a vehicle surface to mount the stem to a vehicle;
a head having a fluid discharge bore extending therethrough;

heat meltable stakes projecting from the head;

recesses formed in the flange for receiving the stakes;

mating means, carried on the head and the stem, for snap connecting the head and the stem together; and seal means engagable between the stem and the head, for sealing the stem to the head.

22. A nozzle mountable on a vehicle for dispensing window washer fluid onto a vehicle window, the nozzle comprising:

a stem having opposed first and second ends;

a flange projecting from the stem between the first and second ends of the stem, the flange engagable with a vehicle surface for mounting the stem to the vehicle surface;

a head having a fluid discharge bore extending therethrough;

mating means, carried on the head and the stem, for snap connecting the head and the stem together;

seal means engagable between the stem and the head for sealing the stem to the head; and means for connecting the flange to the head.

23. A nozzle mountable on a vehicle for dispensing window washer fluid onto a vehicle window, the nozzle comprising:

a stem having opposed first and second ends;

a head having a fluid discharge bore extending therethrough;

a flange projecting from the stem between the first and second ends of the stem, the flange mountable with a vehicle surface;

means for connecting the flange to the head, the connecting means including at least one recess formed in the head, the recess engagable with the flange;

mating means, carried on the head and the stem, for snap connecting the head and the stem together; and seal means engagable between the stem and the head for sealing the stem to the head.

24. The nozzle of claim 23 wherein the connecting means comprises:

a plurality of recesses circumferentially spaced about the head.

25. The nozzle of claim 23 wherein the connecting means further comprises:

a lip extending outward from the flange and engageable in the recess.

26. The nozzle of claim 25 wherein the lip and the recess comprise a plurality of lips and a plurality of recesses.

* * * * *